Dec. 3, 1963 J. V. YONUSHKA 3,113,241
ELECTRONIC SWITCH MEANS FOR FLASHING ELECTRICAL LAMPS
Filed April 7, 1960
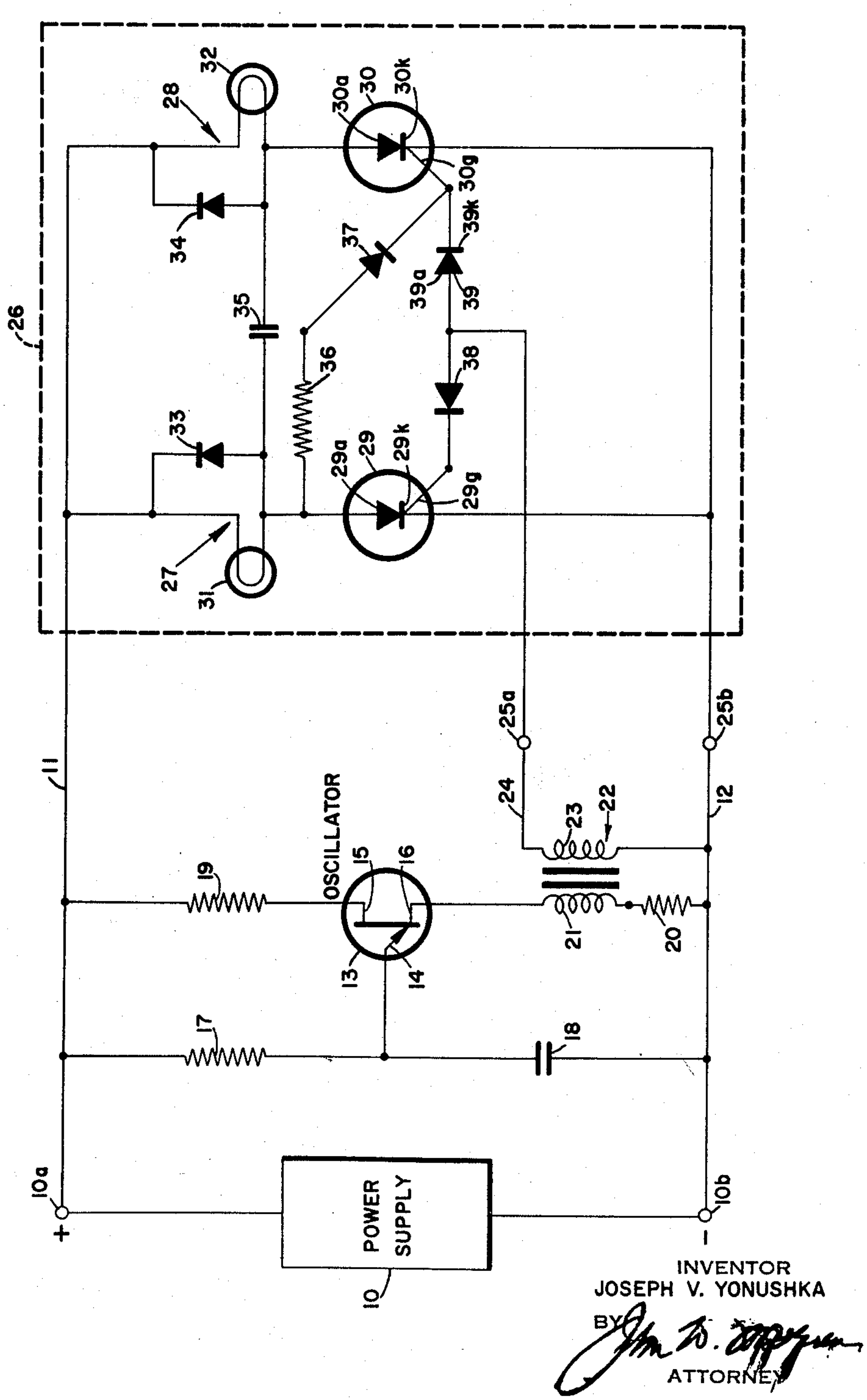
INVENTOR
JOSEPH V. YONUSHKA
BY
ATTORNEY United States Patent Office 3,113,241

Patented Dec. 3, 1963

3,113,241
ELECTRONIC SWITCH MEANS FOR FLASHING ELECTRICAL LAMPS

Joseph V. Yonushka, Duryea, Pa., assignor, by mesne assignments, to Daystrom Incorporated, Murray Hill, N.J., a corporation of Texas Filed Apr. 7, 1960, Ser. No. 20,605
5 Claims. (Cl. 315—200)

This invention relates to electric circuits and particularly to circuitry employed for rendering a plurality of current paths conductive and non-conductive in a predetermined manner.

In applications where it is desired to effect a change of current flow in different circuit paths, it is not uncommon to switch the various circuits by the use of mechanical means such as motors, cams, relays, and switch contacts. This is particularly true where it is desired to vary the current at predetermined intervals of time; for example, in applications such as flashing lights for beacons or aircraft navigation lighting systems.

Mechanical arrangements such as those referred to above suffer from a number of inherent disadvantages. One of these disadvantages is the relatively short switch contact life resulting from the repetitive make and break action of the switching contacts. This results in the further disadvantage of requiring regular maintenance and replacement of the switch contacts. Additionally, the various other mechanical parts are subject to wear and thus also require a certain amount of maintenance. Such maintenance can, of course, represent considerable expense, and this expense added to the initial cost of the mechanical components can represent a relatively high total expenditure, a factor usually of great importance.

Still another disadvantage, and a very important one when the mechanical arrangement referred to above is employed in such mobile applications as navigational lighting systems of aircraft, is the size and weight of the mechanical components.

Accordingly, it is an object of this invention to eliminate the above disadvantages by the use of an electronic switching circuit which does not employ motors, cams, mechanical relays or moving switch contacts.

Briefly, the invention comprises a pair of separate current paths each connected between a pair of terminals adapted for connection to a suitable source of D.-C. power. These current paths each comprise a switching device in series with a suitable impedance.

Input terminals are also provided and are connected to each of the switching devices for applying input pulses thereto for rendering the current paths conductive and non-conductive in a predetermined manner.

Means are also coupled between the switching devices for rendering one of the devices conductive in the absence of any input pulse. Suitable means are also coupled between the switching devices for rendering one of the switching devices non-conductive when the other device becomes conductive.

When a train of input pulses is applied between the input terminals, the various circuit components cooperate with each other to render each of the switch devices sequentially conductive and non-conductive, as long as the input pulses are applied.

All of the objects, features and advantages of the invention will be best understood from a study of the following detailed description taken in conjunction with the claims and with the drawing, which shows a schematic wiring diagram of one circuit arranged in accordance with the principles of the invention.

With particular reference to the drawing, there is provided a power supply 10 which is connected to a pair of terminals 10*a* and 10*b* for supplying a suitable potential by means of the wires 11 and 12, to the circuitry to be described. The circuit includes an oscillator having a suitable frequency such as a relaxation oscillator, which embodies a uni-junction transistor oscillator 13 having an emitter electrode 14 and a pair of base electrodes 15 and 16. A resistor 17 is connected between the positive wire 11 and the emitter 14 and a capacitor 18 is connected between the negative wire 12 and the emitter. The frequency of oscillation can be varied by varying the values of the resistor 17 and capacitor 18. A resistor 19 is connected from the positive wire 11 to the base electrode 15. Between the base electrode 16 and the negative wire 12 there is provided a resistor 20 in series with the primary 21 of a pulse output transformer 22. The oscillator circuit just described functions in a manner known in the art and produces a train of output pulses across the secondary 23 of the pulse output transformer 22. The pulse train from this transformer is applied, by means of the wires 24 and 12, to a pair of terminals 25*a* and 25*b* which are the input pulse receiving terminals for a bistable electronic switching circuit 26, now to be described.

This switching circuit comprises a current path or leg 27 and a current path or leg 28, each having a switching device in the form of uni-directionally conductive devices 29 and 30, and each being provided respectively with anodes 29*a* and 30*a*, cathodes 29*k* and 30*k* and gates or control electrodes 29*g* and 30*g*. These uni-directionally conductive devices may be, for example, silicon controlled rectifiers of the type manufactured by the General Electric Company, having the commercial designation C35F. Connected in series with each of these controlled rectifiers 29 and 30 respectively are loads 31 and 32, and may be, for example, lamps which become incandescent upon the passage of a suitable amount of current therethrough, or may also be other types of impedances. Each of the loads 31 and 32 is bridged by a suitable diode 33 and 34 connected in the manner indicated, for the purpose of providing a low impedance to the passage of current in one direction and a high impedance to the passage of current in the other direction as will subsequently appear.

The switching circuit 26 also includes a capacitor 35 connected between the anodes 29*a* and 30*a* of the two silicon controlled rectifiers 29 and 30. Additionally, the anode of the rectifier 29 is connected to the gate electrode 30*g* of the rectifier 30 through a resistance 36 in series with a diode 37, with the diode connected as shown. A diode 38 and a diode 39 are connected back to back and have their cathodes connected respectively to the gate electrodes 29*g* and 30*g* of the rectifiers 29 and 30. The anodes of these two diodes are connected to the input terminal 25*a*.

The operation of the circuit is as follows. When the potential from the power supply 10 is applied to the terminals 10*a* and 10*b* by a suitable switch, not shown, power is supplied to the oscillator circuit and to the switching circuit 26. Pulses, however, are not produced across the oscillator output transformer 22 immediately. Before these pulses are produced, current passes from the wire 11 through the load 31, the resistor 36, the diode 37, the gate electrode 30*g*, the cathode 30*k* and down to the wire 12. The current through the gate electrode 30*g* is sufficient to cause the rectifier 30 to become conductive. The rectifier 29, however, does not become conductive since the cathode 39*k* of the diode 39 is connected positive with respect to its anode 39*a* and thus cannot pass current into the gate 29*g*.

After the rectifier 30 has been rendered conductive, the first pulse to be supplied from the oscillator appears across the input terminals 25*a*—25*b*. This pulse is positive at the terminal 25*a* with respect to the terminal 25*b* and causes current to flow from the terminal 25*a*, through the diode 38, the gate electrode 29*g*, the cathode 29*k* and back to the terminal 25*b*, thus rendering the rectifier 29 conductive. When this rectifier conducts, its impedance drops sharply to only a few ohms and thus the anode 29*a* is substantially at the potential of the wire 12. As a result, current flows through the capacitor 35, which is in series with the lamp 32 and rectifier 29, across the potential existing between the wires 11 and 12. This current has a high surge value and results in a reduction of the current passing through the rectifier 30. The value of this capacitor is chosen so that a sufficient amount of current is diverted from the rectifier 30 for a sufficient length of time to render this rectifier non-conductive and it will remain non-conductive until the next positive pulse is supplied from the input terminals 25*a*—25*b*. It will be noted that the rectifier 30 will not become conductive by reason of current through the resistor 36 and diode 37 into the gate electrode 30*g*, the cathode 30*k* and to the wire 12, since the anode 29*a*, to which the resistor 36 is connected, is substantially at the potential of wire 12 when the rectifier 29 is conductive. Additionally, the rectifier 30 cannot become conductive because the pulse which rendered the rectifier 29 conductive has passed by the time the rectifier 30 becomes non-conductive.

When the next positive input pulse comes along, it passes through the diode 39, the gate 30*g*, and the cathode 30*k*, thus rendering the rectifier 30 conductive. The impedance of the rectifier 30 is now very low and consequently the right side of the capacitor 35 is now at a different potential than when the rectifier 30 was non-conductive and a large surge of current thus passes through this capacitor, thus diverting current from the rectifier 29 and rendering it non-conductive. The next positive pulse renders the non-conducting rectifier 29 conductive, as before, and the sequence of operation continues so long as positive incoming pulses are supplied.

As each of the rectifiers 29 and 30 becomes conductive, the lamps 31 and 32 respectively become incandescent and, conversely of course, as they become non-conductive, the respective lamp goes out. It will be appreciated therefore that the lamps become successively energized, i.e., as one is lit the other is out, and vice versa.

It should be noted that the diode 38 is merely a protective device and can be eliminated so long as no negative potential surges are likely. If such surges are present however, and the diode 38 is not in the circuit, the current direction through the gate electrode 29*g* would be reversed and would ruin the rectifier 29. This of course cannot occur with the diode 38 connected as shown since it is reverse biased with respect to the current direction which would result from such negative potential surges.

It is also to be noted that the doides 33 and 34 function in some measure as protective devices, insuring that any potential spikes that might result by reason of the inductance associated with the lamps 31 and 32 and their leads will be shorted out by these diodes when connected as shown. Were these diodes not present, the spike potentials produced could attain a sufficient value to render the anode of the non-conductive rectifier sufficiently positive with respect to its cathode to cause conduction. If this condition occurs, both rectifiers would then be conductive, and since successful operation of the circuit depends upon one rectifier remaining non-conductive while the other is conductive, control would be lost, flashing would cease and both lamps 31 and 32 would be constantly lighted. However, if purely resistive loads are used with this circuit, the diodes 33 and 34 can be safely eliminated.

The circuit comprising the resistor 36 and diode 37 insures that the rectifier 30 is rendered conductive before any pulses are applied to the input pulses 25*a*—25*b* when the circuit is first placed in operation by impressing a potential between the wires 11 and 12. This is important because the first incoming pulse would normally trigger both rectifiers and thus some means is necessary for insuring that only one rectifier is rendered conductive initially.

The diode 39 is reverse connected with respect to the current through the resistor 36 and diode 37 and thus prevents the rectifier 29 from also being rendered conductive by the initial current through the resistor 36 and diode 37.

It is important to note that the invention will operate very satisfactorily with either of the lamps 31 or 32 replaced by a suitable impedance, and thus can be used for actuating only a single lamp if desired.

By means of the invention, it will be appreciated that the necessity for maintenance has been drastically reduced, more reliable operation results, initial cost is reduced and size and weight reductions of large proportions have been achieved.

Since many changes could be made in the above circuit and many apparently widely different embodiments of this invention could be made without departing from the scope thereof, it is intended that all matter contained in the above description or shown in the accompanying drawing shall be interpreted as illustrative and not in a limiting sense.

I claim:

1. In combination, a first pair of terminals adapted for connection to a suitable source of direct current power, first and second current paths connected between said first pair of terminals, said first and second paths each including a switching device in series with an impedance, a pair of input terminals connected to each of said switching devices and adapted to receive a train of input pulses, means comprising a resistance in series with a diode directly connected between said devices for rendering said device in said first path conductive in the absence of input pulses, means including a second diode coupled between said devices for preventing conduction in said device in said second path when said device in said first path is rendered conductive in the absence of input pulses, and further means including a capacitor coupled between said devices for rendering said non-conducting device conductive and said conducting device non-conductive upon the application of an input pulse to said input terminals.

2. In combination, a pair of conductors adapted for connection to a suitable source of direct current power, first and second direct current paths connected between said pair of conductors, each of said current paths including an impedance in series with a unidirectionally conductive device provided with a control electrode, said devices each having a conductive and a non-conductive state, a pair of conductors for receiving a train of input pulses, means for coupling said pulses to said control electrodes on each of said devices, means comprising a resistance in series with a diode coupled between one of said devices and the control electrode of the other one of said devices for rendering said other device conductive in the absence of input pulses, and means also coupled to each of said devices for diverting current from each of said devices when it is in a conductive state to cause the same to become non-conductive when pulses are applied to said pulse receiving conductors.

3. In combination, a pair of conductors adapted for connection to a suitable source of direct current power, first and second direct current paths connected between said pair of conductors, a pair of unidirectionally conductive devices each having an anode, a cathode and a control electrode and having a conductive and a non-conductive state, each current path comprising a load impedance in series with the anode-cathode circuit of one of said devices, a pair of conductors for receiving a train of input pulses, one of said pulse receiving conductors being directly connected to the cathode of each of said devices, a diode directly connected to the control electrode of each of said devices, the other of said pulse receiving conductors being coupled to each of said control electrodes through the diode associated therewith, the anode of one of said devices being coupled to the control electrode of the other of said devices through a resistor and diode connected in series with each other, and a capacitor directly coupled between the anodes of each of said devices for cooperating with a train of input pulses applied to said pulse receiving conductors to cause each of said devices to become alternately conductive and then non-conductive upon the application of input pulses, each path being conductive when the other path is non-conductive and non-conductive while the other path is conductive.

4. The invention described in claim 3 wherein the load impedance in each current path comprises an incandescent lamp.

5. The invention described in claim 4 wherein each incandescent lamp is bridged by a diode, the diode being connected so that the anode of the diode in each current path is connected to the anode of the unidirectionally conductive device in that current path.

References Cited in the file of this patent

UNITED STATES PATENTS

| | | |
|---|---|---|
| 2,916,670 | Pederson | Dec. 8, 1959 |
| 2,929,940 | Jones | Mar. 22, 1960 |
| 2,944,166 | De Miranda | July 5, 1960 |